(12) United States Patent
Ohba

(10) Patent No.: US 7,341,311 B2
(45) Date of Patent: Mar. 11, 2008

(54) VEHICLE SEAT RECLINING DEVICE

(75) Inventor: Tetsuya Ohba, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 11/656,991

(22) Filed: Jan. 24, 2007

(65) Prior Publication Data
US 2007/0176478 A1 Aug. 2, 2007

(30) Foreign Application Priority Data
Jan. 31, 2006 (JP) ............... 2006-021889
Jun. 29, 2006 (JP) ............... 2006-178888

(51) Int. Cl.
*B60N 2/235* (2006.01)
(52) U.S. Cl. ............... 297/367; 297/216.13
(58) Field of Classification Search ........... 297/367, 297/216.13, 216.14
See application file for complete search history.

(56) References Cited

U.S. PATENT DOCUMENTS 5,590,931 A * 1/1997 Fourrey et al. ............ 297/366
5,857,746 A * 1/1999 Barrere et al. ............. 297/367
6,085,386 A * 7/2000 Blanchard et al. .......... 297/367
6,648,414 B2 * 11/2003 Ikegaya et al. ............. 297/367
6,666,515 B2 * 12/2003 Asano et al. ............... 297/366
6,854,802 B2 * 2/2005 Matsuura et al. ........... 297/367
6,908,156 B1 * 6/2005 Park et al. .................. 297/366

FOREIGN PATENT DOCUMENTS

JP 2004 121508 A 4/2004

* cited by examiner

*Primary Examiner*—Peter R. Brown
(74) *Attorney, Agent, or Firm*—Foley & Lardner LLP

(57) ABSTRACT

A seat reclining device is comprised of a base member connected to one of a seat back and a seat cushion; a rotating member connected to the other of the seat back and the seat cushion; a lock tooth having an external gear engageable with the internal gear of the rotating member; a shaft portion having an inner-periphery guiding surface for swinging the lock tooth on the shaft portion; and a weak portion formed at an end portion of the lock tooth opposite to the external gear across the shaft portion.

10 Claims, 8 Drawing Sheets

US 7,341,311 B2

VEHICLE SEAT RECLINING DEVICE

BACKGROUND OF THE INVENTION

The present invention relates to a vehicle seat reclining device for adjustably fixing an angle of a seat back relative to a seat cushion, and more particularly to a vehicle seat reclining device, which is adaptable to a case that a large load is applied to a seat back.

As a vehicle seat reclining device, there is known a device, which is constituted by a body frame installed at a base plate of a seat cushion and a cover member installed at an arm plate of a seat back, and which is arranged to limit a relative rotation between the body frame and the cover member and to maintain an angular position of the seat back by engaging an external gear of a lock tooth attached to the seat back with an internal gear formed on an inner peripheral surface of the cover member.

In order to fix the lock tooth, a shaft portion and a pair of guide portions are formed in the vicinity of the body frame, and the lock tooth has a depressed bearing portion, which is swingably connected to the shaft portion and a sliding surface, which slides in contact with the guide surfaces of the pair of guide portions and is coaxial with the bearing surface. A cam for pushing the lock tooth to the outer side so as to engage the external gear with the internal gear is provided at a center portion of the internal gear.

In the thus arranged conventional vehicle seat reclining device, the lock tooth receives an external force of rotating the seat back in the reclining direction generated during a vehicle collision, through the engagement between an internal gear and an external gear. At this moment, since the lock tooth is supported by the shaft portion and one of the pair of the guide portions, the rotation of the cover member relative to the body frame is limited, and therefore the seat back is not rotated from a predetermined angular position.

Although a belt anchor for supporting a force applied to a seat belt is conventionally provided at a center pillar of a vehicle body, there has been lately increased a type that the belt anchor is provided at a seat back. Therefore, in case of the belt anchor provided at the seat back, an inertia force due to a weight of a vehicle occupant during a vehicle collision is transmitted to the seat back through the seat belt, and therefore a force greater than that of a type that the belt anchor is provided at the center pillar is applied to the seat back in the forward direction. Accordingly, the vehicle seat reclining device of the type that the belt anchor is provided at the seat back is requested to be durable to a further large load.

Japanese Published Patent Application No. 2004-121508 discloses a typical vehicle seat reclining device. This conventional vehicle seat reclining device is arranged to form a clearance between one of a pair of guide portions 112A and 112B and an external gear side of a lock tooth 110 so that when a rearward directional load is applied to the seat back and a load is applied from the cover member to the lock tooth 110 through an external gear 110d and an internal gear 107a, a force of rotating the lock tooth at the present position so that the lock tooth 110 enters the clearance. As a result, a shaft portion side of the external gear 110d is pushed toward the internal gear 107a, and the engagement strength between the external gear 110d and the internal gear 107a is increased.

SUMMARY OF THE INVENTION

However, if a rotational force directed along the circumferential direction toward one of the guide portions 112A and 112B is applied to the lock tooth 110 through the external gear 110d and the internal gear 107a, as shown in FIG. 3, a bearing portion 110s of the lock tooth 110 is pressed toward an outer-peripheral surface of the shaft portion 111. Therefore, the lock tooth 110 receives a reaction force from the shaft portion 111 and rides on an circular shaped outer-peripheral surface of the shaft portion 111. Due to this riding on, a bending force is applied at a portion of the lock tooth 110 adjacent to the bearing portion 110c, and a portion of the external gear 110d adjacent to the shaft portion 111 tends to displace in the direction separating from the internal gear 107a. Although this conventional device is arranged to maintain the engagement between the external gear 110d and the internal gear 107a by breaking the bearing portion 110c of the lock tooth 110, a breakage strength of the lock tooth 110 is not stabilized in this device, and the deviation of the strength of this seat reclining device becomes large.

It is therefore an object of the present invention to provide a vehicle seat reclining device which solves the above discussed problem.

According to an aspect of the present invention, there is provided a seat reclining device for swingably connecting a seat back to a seat cushion. The seat reclining device comprises: a base member connected to one of the seat back and the seat cushion; a rotating member connected to the other of the seat back and the seat cushion, the rotating member being rotatable relative to the base member, an internal gear being formed on an inner peripheral surface of the rotating member; a lock tooth having an external gear, which is engageable with the internal gear of the rotating member, the lock tooth being swingable in the direction of engaging and disengaging the external gear with and from the internal gear, the lock tooth having a bearing portion which has an arc shaped bearing surface; a shaft portion integrally formed with the base member, the shaft portion having an inner-periphery guiding surface, on which the bearing surface of the lock tooth slides in contact with the inner-periphery guiding surface of the shaft portion, the shaft portion being aligned with the external gear along a circumferential direction about a rotational center of the rotating member; a pair of guide portions integrally formed with the base member; a cam pushing the lock tooth to engage the external gear with the internal gear; and a weak portion formed at an end portion of the lock tooth opposite to the external gear across the shaft portion.

The other objects and features of this invention will become understood from the following description with reference to the accompanying drawings.

DETAILED DESCRIPTION OF THE INVENTION

Hereinafter, there are discussed embodiments of a vehicle seat reclining device according to the present invention.

First Embodiment

Figure 7:
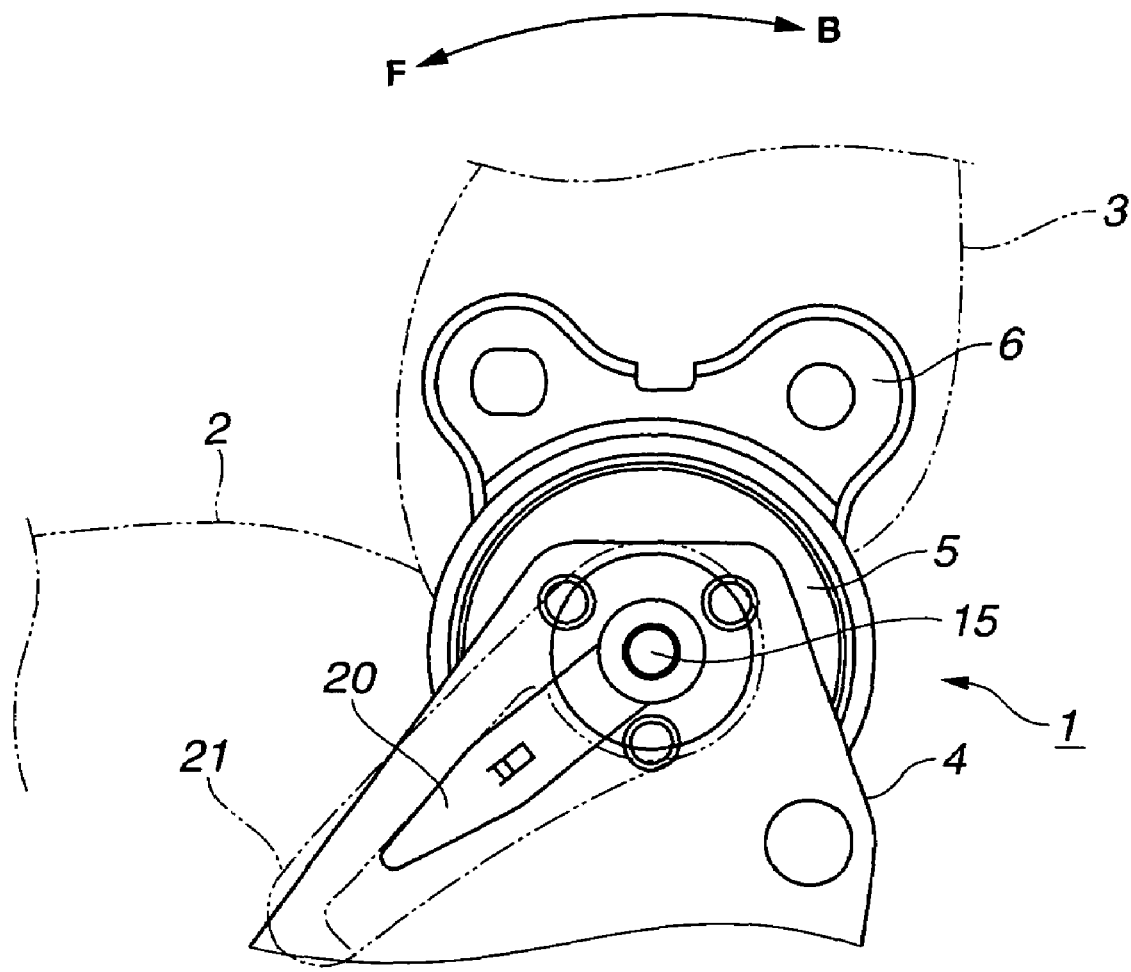
FIG. 7 is a schematic structural view of a vehicle seat which is commonly applied to the embodiments according to the present invention.

Firstly there is discussed the vehicle seat reclining device 1 according to first embodiment of the present invention. As shown in FIG. 7, a seat back 3 is connected to a seat cushion 2, on which a vehicle occupant sits. The seat back is swingable in the vehicle forward and backward directions relative to the seat cushion 2. A body frame (base member) 5 is connected to the seat cushion 2 through a base plate 6. On the other hand, a cover member (rotating member) 7 is connected to the seat back 3 through an arm plate 6. A not-shown spring is provided so as to bias the seat back 3 toward the seat cushion 2 in the forward direction F of the vehicle, as shown in FIG. 7.

Figure 1A:
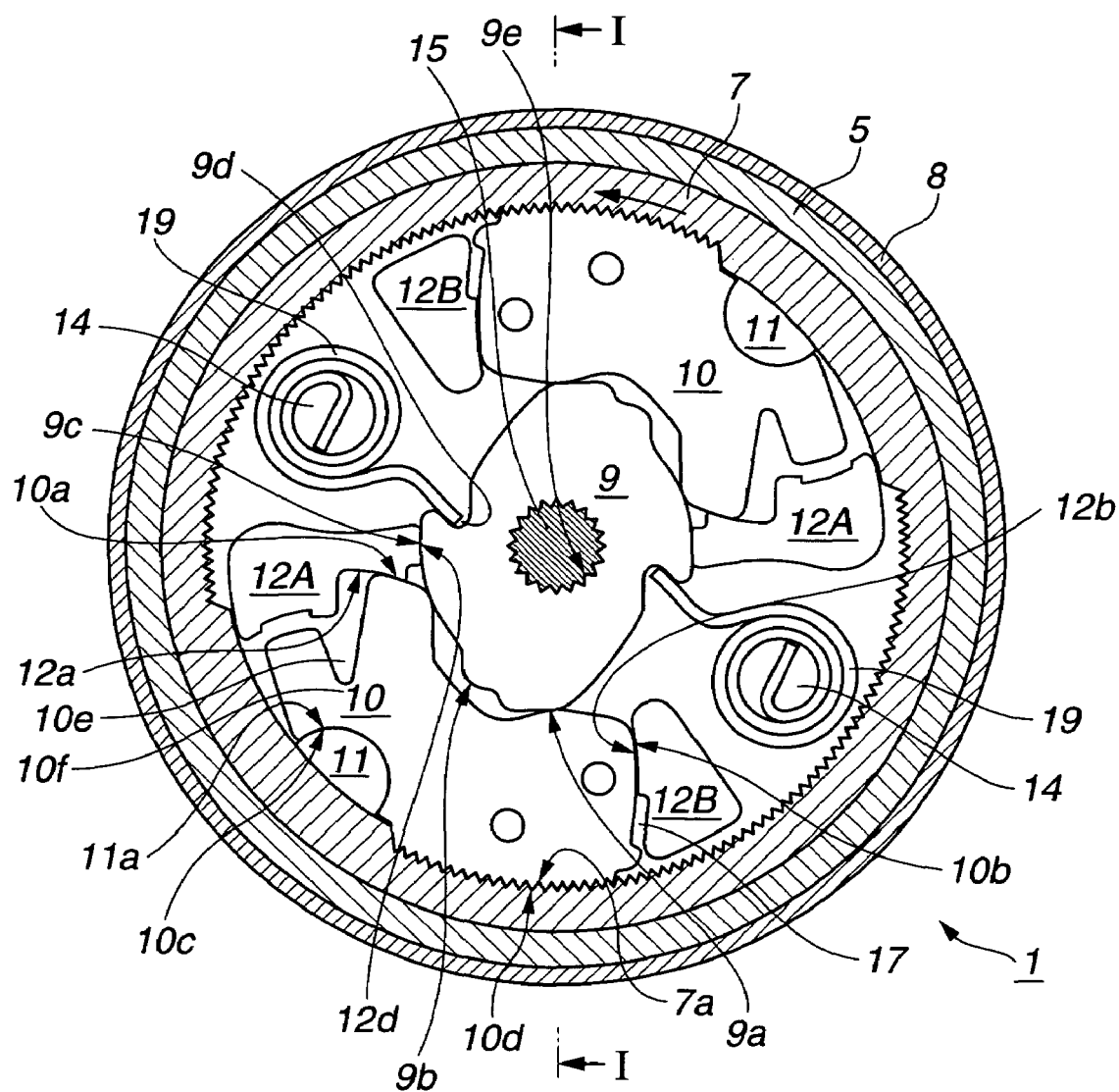
FIG. 1A is a view, partially in section, showing a constitution of a vehicle seat reclining device according to a first embodiment of the present invention.
Figure 1B:
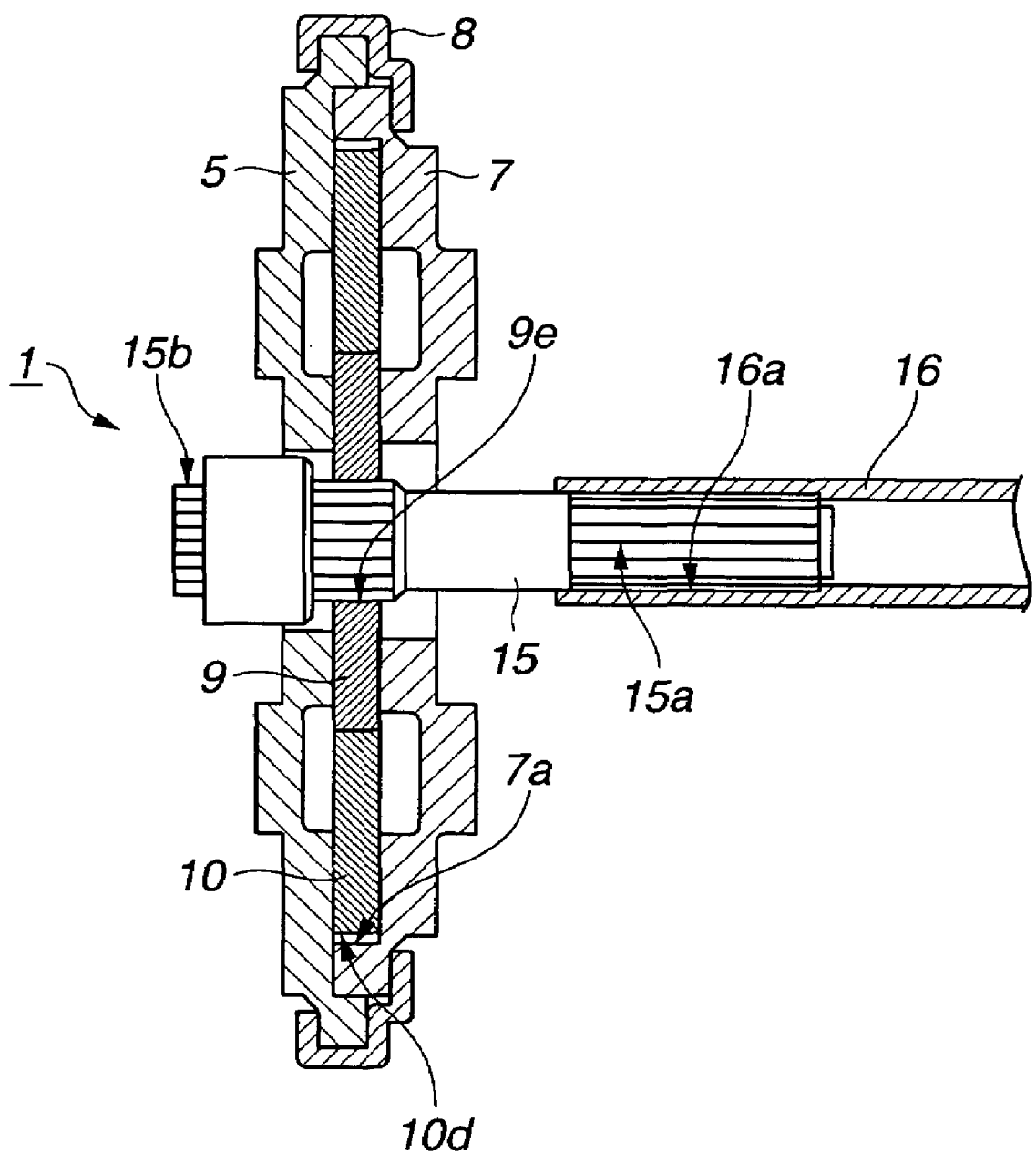
FIG. 1B is a cross sectional view taken in the direction of the arrows I-I in FIG. 1A.

The body frame (base member) 5 and the cover member (rotating member) 7 constitute the vehicle seat reclining device 1 shown in FIGS. 1A and 1B. Hereinafter, there is discussed a constitution of the vehicle seat reclining device 1. As shown in FIGS. 1A and 1B, the body frame 5 is formed into a shape having a circular depressed portion by half blanking an inner portion of a disc. Similarly, the cover member 7 is formed into a shape having a circular depressed portion by half blanking an inner portion of a disc. Further, an internal gear 7a is formed at an inner peripheral surface of defining the circular depressed portion of the cover member 7. The cover member 7 is fitted into an inner portion of the circular depressed portion of the body frame 5 so as to be coaxial and relatively rotatable with respect to the body frame 5. As shown in FIG. 1B, outer peripheral portions of the cover member 7 and the body frame 5 are clamped by a ring-shaped holder 8, so that the cover member 7 and the body frame 5 are aligned without departing in the axial direction and are relatively rotatable. A cam 9 of a rotating type is disposed between the body frame 5 and the cover member 7 in the axial direction and at an axial center thereof. A pair of swingable lock tooth's 10 are disposed at upper and lower positions of the cam 9 so as to face with each other across the cam 9. Although a pair of the lock tooth's 10 are employed in the vehicle seat reclining device 1 throughout the embodiments according to the present invention, they are symmetrically arranged about a center axis of the vehicle seat reclining device 1, the operations thereof are the same. Therefore, the explanation relating to the lower one of the lock tooth's in FIG. 1A is mainly made hereinafter.

In order to swingably guide the lock tooth 10 along a circular orbit, a semi(half)-column-shaped shaft portion 11 having an inner-periphery guiding surface 11a is integrally formed with the body frame 5, within an inner side of the circular orbit. On the other hand, the lock tooth 10 has a bearing surface 10c formed by cutting a part of the lock tooth 10 into a half-round shape. Further, at an outer periphery side of the circular orbit for swingably guiding the lock tooth 10 along the circular orbit, first and second guide projections (a pair of guide portions) 12A and 12B are integrally formed with the body frame 5. First and second outer-periphery guiding surfaces (outer-periphery guiding surfaces) 12a and 12b are formed on the first and second guide projections 12A and 12B, respectively, so as to guide the lock tooth 10. The lock tooth 10 has first and second sliding outer-peripheral surfaces 10a and 10b, which slide on the first and second outer-periphery guiding surfaces 12a and 12b, respectively. Since the lock tooth 10 swings along the circular orbit, all of the first and second outer-periphery guiding surfaces 12a and 12b and the first and second sliding outer-peripheral surfaces 10a and 10b have circular surfaces, which are concentrically arranged about the center of the shaft portion 11, respectively. An external gear 10d, which is capable of engaging with the internal gear 7a, is formed on a surface of the lock tooth 10 opposite to the internal gear 7a, which swings along the circular orbit. The shaft portion 11 is aligned with the external gear 10a along a circumferential direction about a rotational center of the cover member (rotating member) 7.

In order to push the lock tooth 10, which has the external gear 10a for engaging and disengaging with the internal gear 7a, toward the internal gear 7a, the cam 9 is provided. By rotating the cam 9 about the center of a center hole 9e of the cam 9 in the anticlockwise direction in FIG. 1A, the pair of the lock tooth's 10 are pushed toward the diametrically outer side relative to the center of the cam 9, and therefore the external gear 10d is engaged with the internal gear 7a. Inversely, by rotating the cam 9 about the center of the center hole 9e in the clockwise direction in FIG. 1A, the engagement between the external gear 10d and the internal gear 7a is cancelled. By engaging the external gear 10d with the internal gear 7a, the rotation of the cover member 7 relative to the body frame 5 is restricted and is put in a lock state, and the seat back 3 is held at a predetermined angular position relative to the seat back 3.

The cam 9 has a locking cam surface 9a and a lock-releasing cam surface 9b. The locking cam surface 9a functions to swing the lock tooth 10 about center of the shaft portion 11 in the clockwise direction and to engage the external gear 10d with the internal gear 7a, according to the anticlockwise directional rotation of the cam 9. The lock-releasing cam surface 9b functions to swing the lock tooth 10 about center of the shaft portion 11 in the anticlockwise direction and to disengage the external gear 10d from the internal gear 7a, according to the clockwise directional rotation of the cam 9. In order to limit the movement of the cam 9 in the left and right directions in FIG. 1A, a sliding outer-peripheral surface 9c is formed on each of the left and right side portions of the cam 9, and a slide contact surface 12d is formed at each of the left and right guide projections 12A. The sliding outer-peripheral surface 9c is always slidably in contact with the slide contact surface 12d. The sliding outer-peripheral surface 9c is formed into a circular arc formed about the center hole 9e of the cam 9.

When the seat back 3 receives a load directed to the forward direction F in FIG. 7, the relative rotational force of the cover member 7 relative to the body frame 5 is transmitted to the lock tooth 10 through the engaged portions between the internal gear 7a and the external gear 10d. Therefore, the lock tooth 10 receives a force for rotating the lock tooth 10 in the anticlockwise direction in FIG. 1A. In order to support the lock tooth 10 of receiving the anticlockwise direction force by the shaft portion 11, the second guide projection (one of the guide portions) 12B and the cam 9, at a center side, which is a diametrically inner side about the rotation center of the cover member 7, the second outer-periphery guiding surface 12b and the second slide outer-peripheral surface 10b, which slides with each other, are formed on the opposite surfaces of the second guide projection 12B and the lock tooth 10, respectively. At a diametrically outer side, an outer-peripheral clearance 17 is formed in the vicinity of the internal gear 7a and between the second guide projection 12B and the lock tooth 10. When the lock tooth 10 receives the force of rotating in the anticlockwise direction in FIG. 1A together with the cover member 7, the above-discuss arrangement generates a rotational moment of deforming a portion of the external gear 10d adjacent to the shaft portion 11 in the direction in which the external gear 10 is further strongly engaged with the internal gear 7a. As a result, the portion of the external gear 10d adjacent to the shaft portion 11 is further strongly engaged with the internal gear 7a so as to increase an engagement degree between the external gear 10d and the internal gear 7a.

On the other hand, the shaft portion 11 has an arc-shaped inner-periphery guiding surface 11a, which swingably supports the lock tooth 10. The lock tooth 10 has an arc-shaped bearing surface 10c, which slides in contact with the inner-periphery guiding surface 11a. Although both end portions of the inner-periphery guiding surface 11a slide in contact with both end portions of the bearing surface 10c, slight clearances are formed between the opposite end portions of the inner-periphery guiding surface 11a and the bearing surface 10c. These clearances are provided so as to decrease the backlash of the cover member 7 in the rotational direction relative to the body frame 5 under the lock state and to strengthen the engagement between the external gear 19d and the internal gear 7a by slightly moving the lock tooth 10 toward the internal gear 7a when a large external force is applied to the lock tooth 10. In the situation that the lock tooth 10 is rotated together with the cover member 7 in the anticlockwise direction in FIG. 1A due to the external force to the lock tooth 10, since the lock tooth 10 is supported by the shaft portion 11, the lock tooth 10 receives the reaction force from the shaft portion 11, and tends to move along the inner-periphery guiding surface 11a. Therefore, a moment of rotating the lock tooth 10 in the clockwise direction in FIG. 1A is generated, and the portion of the external gear 10d adjacent to the shaft portion 11 tends to separate from the internal gear 7a.

Therefore, there is provided a weak portion 10f. The weak portion 10f functions so as to avoid the lock tooth 10 from being supported by the shaft portion 11 and therefore the shaft portion 11 allows that the lock tooth 10 rotates about the rotational center of the cover member 7 in the anticlockwise direction in FIG. 1A, and so as to prevent the external gear 10d from being released from the internal gear 7a, when the external force directed to the forward direction F, which is applied to the seat back 3 shown in FIG. 7, becomes greater than a predetermined force. The weak portion 10f is a part of a bearing portion of the lock tooth 10 and is provided by forming a cutout portion 10e so as to induce a breakage or deformation of an end portion located at an opposite side of the external gear 10d across the shaft portion 11. The cutout portion 10e is formed by cutting a part of the lock tooth 10 into a V-shape so as to decrease a width of the V-shaped cutout toward the center of the shaft portion 11.

The lock tooth 10 has a first slide outer-peripheral surface (slide outer-peripheral surface) 10a, which slides with the first outer-periphery guide surface 12A of the first guide projection 12A. Further, the cutout portion 10e is located at an outer side of the first slide outer-peripheral surface 10a in the diametrical direction as to the rotational center of the cover member 7.

The vehicle seat reclining device 1 is provided at each of the laterally both sides of the seat cushion 2. As shown in FIG. 1B, both operation shafts 15 respectively provided at the vehicle seat reclining devices 1 are connected through a cylindrical shaft 16. The operation shaft 15 is fitted with the center hole 9b of the cam 9 by means of serration structure. The operation shaft 15 is connected to the shaft 16 through serrations 15a formed at an end portion of the operation shaft 15 and serrations 16a formed at an end portion of the cylindrical shaft 16.

As shown in FIG. 1B, serrations 15b are formed at the other end portion of the operation shaft 15. As shown in FIG. 7, a part of the serrations 15b protrudes from the base plate 4 outwardly, a control lever 20 is attached to the serrations 15b, and a control knob 21 is attached to the control lever 20.

Subsequently, there is explained a manner of operation of the vehicle seat reclining device 1 according to the first embodiment of the present invention.

Under a condition that the vehicle seat reclining device 1 is attached to the seat, a biasing force of lock springs 19 normally put the cam 9 in the anticlockwise rotated state as shown in FIG. 1A. Accordingly, the lock tooth 10 is pushed by the lock cam surface 9a and is guided by the first and second guide projections 12A and 12B. Further, the lock tooth 10 swings in the clockwise direction about the center of the shaft portion 11 and is put in a state that the external gear 10d is engaged with the internal gear 7a of the cover member 7. That is, the seat reclining device 1 is put in the lock state and therefore the swinging of the seat back 2 is restricted.

Subsequently, by rotating the control shaft 15 in the clockwise direction in FIG. 7 against the biasing force of the lock spring 19 through the manipulation of the control knob 21, the connection between the lock cam surface 9a of the cam 9 and the lock tooth 10 in FIG. 1A is released, and the lock-canceling cam surface 9b pushes the lock tooth 10 in the clockwise direction. Therefore, the lock tooth 10 swings in the anticlockwise direction about the center of the shaft portion 11. The engagement between the external gear 10d and the internal gear 7a is cancelled. The seat reclining device 1 is therefore put in the lock released state, and the arm plate 3 and the seat back 3, which are attached to the cover member 7, are rotated in the forward direction F in FIG. 7 due to a biasing force of a not-shown spring.

By rotating the seat back 3 toward the backward direction B against the biasing force of the spring and by releasing a hand of a seat occupant from the control knob 21 when the seat back 3 is positioned at a desired angular position, the cam 9 rotates in the anticlockwise direction due to the biasing force of the lock spring 19, and the lock cam surface 9a pushes the lock tooth 10 in the clockwise direction about the center of the shaft portion 11. Therefore, the external gear 10d of the lock tooth 10 is engaged with the internal gear 7a, and the seat reclining device 1 returns to the lock state.

Subsequently, there is discussed the manner of operation under a situation that an inertia force of a vehicle occupant is applied to the seat back 3 through a seat belt due to a vehicular front collision and an external force directed to the forward direction F in FIG. 7 is applied to the seat back 3, with reference to FIG. 2. Under this situation, the cover member 7 tends to relatively rotate in the anticlockwise direction relative to the body frame 5 as shown by an arrow in FIG. 1A, and the rotational force is transmitted to the lock tooth 10 through the engagement between the internal gear 7a and the external gear 10d. Therefore, the lock tooth 10 tends to rotate in the anticlockwise direction in FIG. 2, and the lock tooth 10 is supported by the lock cam surface 9a of the cam 9, the inner-periphery guiding surface 11a of the shaft portion 11 and the second outer-periphery guiding surface 12b. At this moment, since a load is applied from the lock tooth 10 to the shaft portion 11, a reaction force $R_1$ is applied from the shaft portion 11 to the lock tooth 10. When the reaction force $R_1$ becomes greater than a predetermined force, the weak portion 11f of the lock tooth is broken or deformed. Therefore, the load directed from the lock tooth 10 to the shaft portion 11 and the reaction force $R_1$ directed from the shaft portion 11 to the lock tooth 10 decrease, and this decreases a force for displacing a portion of the external gear 10d adjacent to the shaft portion 11 from the internal gear 7a toward a released direction. That is, when the lock tooth 10 is rotated in the circumferential direction together with the cover member 7, which is relatively rotated by the external force, the end portion of the lock tooth 10 is broken or deformed. Therefore, the bearing portion of the lock tooth 10 does not move along the inter-periphery guiding surface 11a and the portion of the external gear 10d adjacent to the shaft portion 11 does not displace and release from the internal gear 7a toward the cam 9. Consequently, it becomes possible to stabilize the attitude of the lock tooth 10, to properly maintain the engagement between the external gear 10d and the internal gear 7a, and to improve the strength and the stability of the strength of the seat reclining device 1.

Further, a bending moment is generated by the existence of the outer-peripheral clearance 17, and the portion of the external gear 10d of the lock tooth 10 adjacent to the shaft portion 11 tends to displace in the direction of increasing the engagement of the external gear 10d with the internal gear 7a. Although the lock tooth 10 tends to displace in the direction that the portion of the external gear 10d adjacent to the shaft portion 11 further strongly engages with the internal gear 7a, due the remaining of a part (about a half) of the bearing surface 10c on the bearing porting of the lock tooth 19, the part of the bearing surface 10c is in contact with the shaft portion 11 so as to prevent the external gear 10d from excessively engaging with the internal gear 7a and to limit the lock tooth 10 from rotating in the anticlockwise direction while a contact with the cam surface 9a acts as a supporting point. Therefore, the portion of the external gear 10d adjacent to the shaft portion 11 is certainly engaged with the internal gear 7a while the attitude of the lock tooth 10 is stabilized, and the engagement between the external gear 10d and the internal gear 7a is stabilized and strengthened.

Subsequently, there is discussed a manner of operation under a situation that due to a rear side collision of the vehicle, a vehicle occupant is pressed on the seat back 3, and an external force directing to the rearward direction in FIG. 7 is applied to the seat back 3, with reference to FIG. 2. Under this situation, the cover member 7 and the lock tooth 10 tend to rotate in the clockwise direction (a direction opposite to the arrow in FIG. 2) relative to the body frame 5. At this moment, the lock tooth 10 is supported by the lock cam surface 9a of the cam 9, the shaft portion 11, the inner-periphery guiding surface 11a and the first outer-periphery guiding surface 12a.

Herein, when the external force becomes large, the shaft portion 11 is pushed by a portion of the bearing surface 10c adjacent to the external gear 10d and is then deformed. Further, the first guide projection 12A is pushed by the first slide outer-peripheral surface 10a and is deformed. The end portion of the lock tooth 10 becomes in contact with the first guide projection 12A, and therefore the bearing portion of the lock tooth 10 is limited to further move. Accordingly, a reaction force directed toward the direction of bending the bearing portion of the lock tooth 10 is generated. However, since the end portion of the lock tooth 10 is broken or deformed at the weak portion 10f, the reaction force is decreased. Therefore, the bending moment applied to the bearing portion of the lock tooth 10 is decreased. This prevents the lock tooth 10 from being broken at the position between the first slide outer-peripheral surface 10a and the external gear 10d. Consequently, the attitude of the lock tooth 10 is stabilized, the engagement between the external gear 10d and the internal gear 7a is properly maintained, and the strength of the seat reclining device is stabilized and improved.

The hardening treatment is applied on all surface of the lock tooth 10 since the lock tooth 10 includes the external gear 10d. As a hardening treatment, a thermal treatment such as a carburization is carried out. Accordingly, the lock tooth 10 is broken at the weak portion 10f near the cutout portion 10e when the lock tooth 10 receives the above-discussed force. The end portion of the bearing portion of the lock tooth 10 may be formed into a soft portion, by protecting the end portion from the carburization. By this treatment, the weak portion 10f is deformed without being broken.

Figure 2:
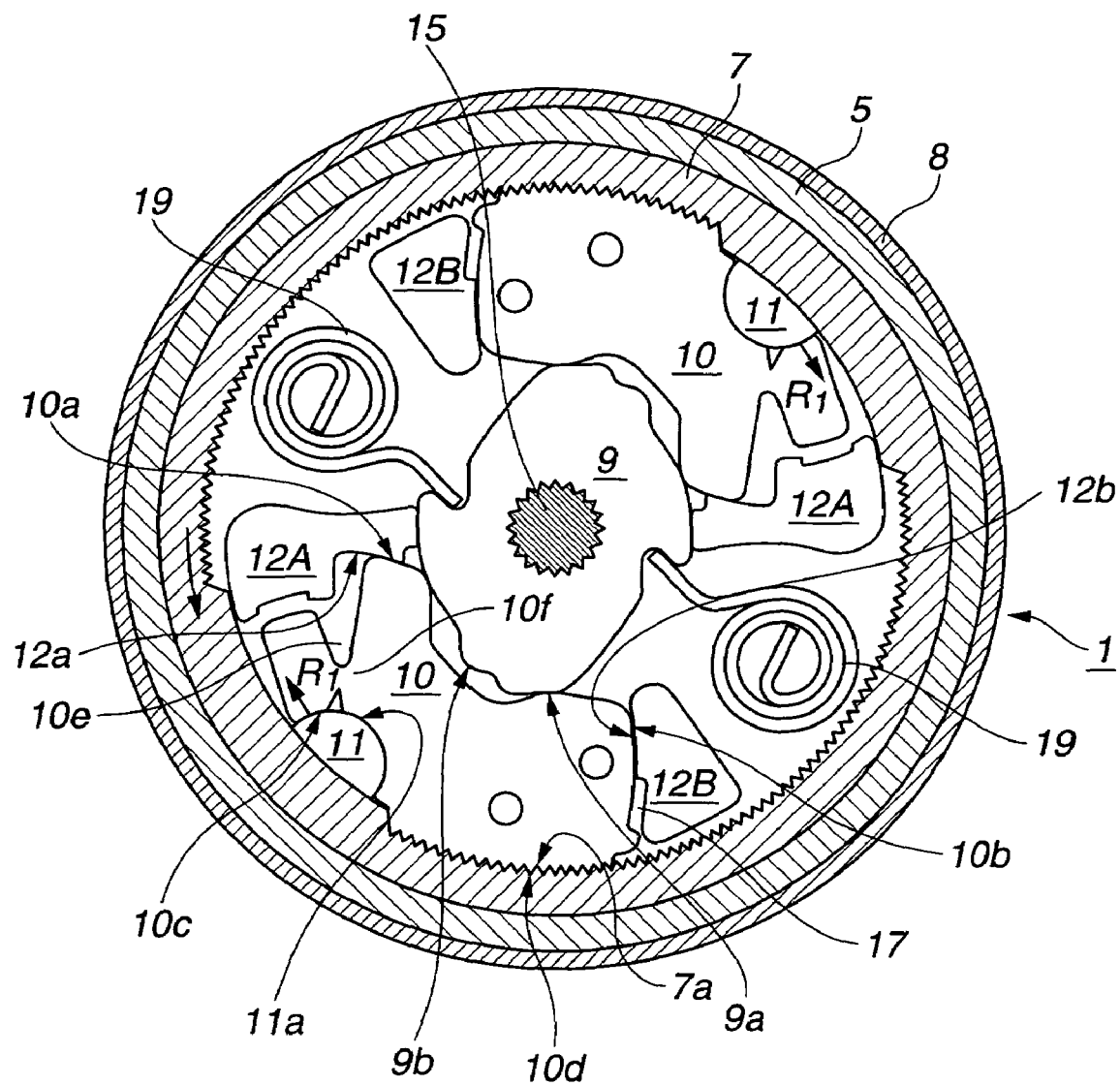
FIG. 2 is an explanatory view of the first embodiment in case that a large load directed to the forward direction is applied to a seat back.
Figure 3:
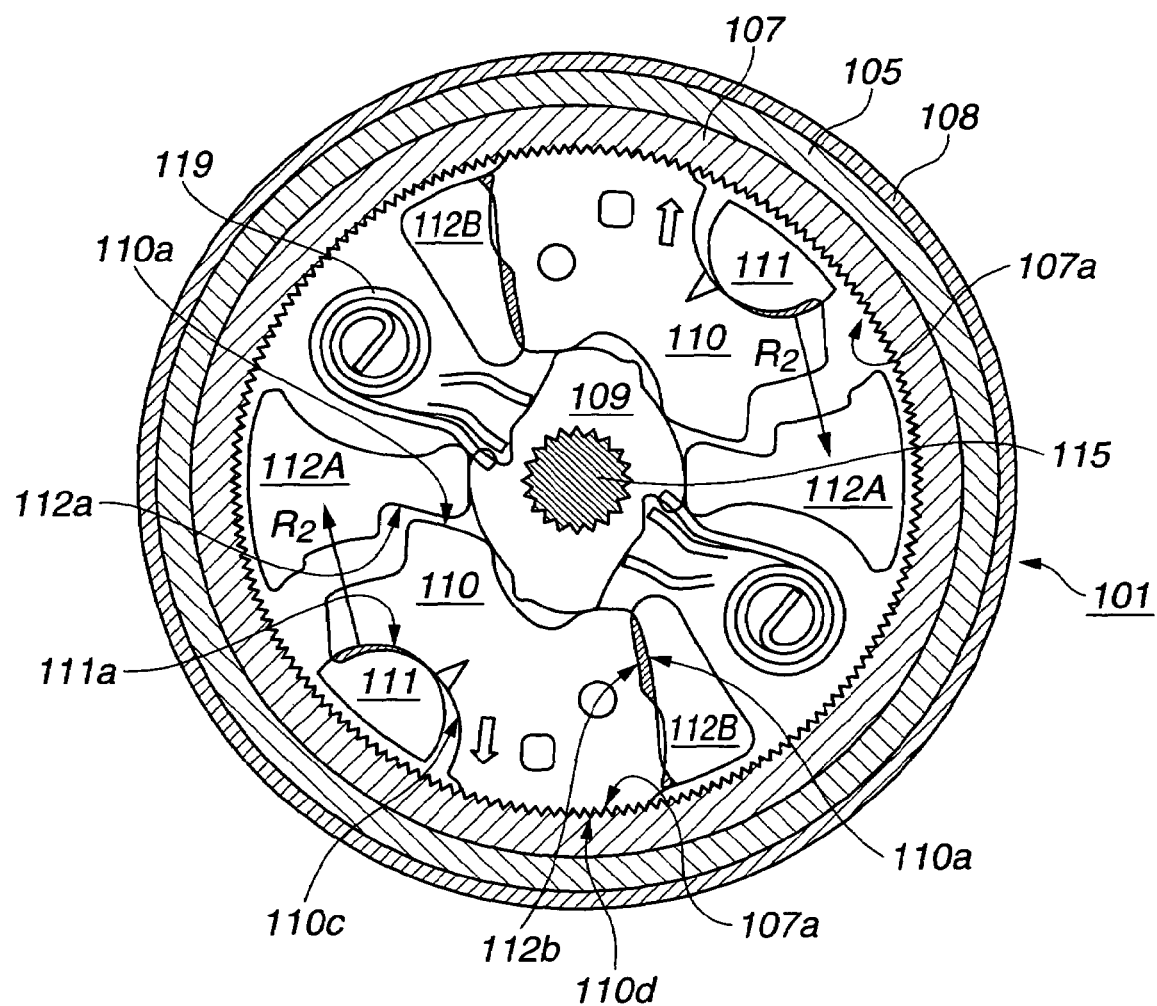
FIG. 3 is an explanatory view of a conventional seat reclining device in case that a large load directed to the forward direction is applied to a seat back.

FIG. 3 shows an operation of a conventional vehicle reclining device 1 in order to compare this conventional operation with the operation of the vehicle reclining device according to the present invention shown in FIG. 2. In FIG. 3, when the load directed toward the forward direction F, which is applied to the seat back 3 becomes large and the end portion of a lock tooth 110 relatively displaces in the circumferential direction, a large reaction force $R_2$ is applied from a shaft portion 111 to the lock tooth 110. Therefore, a portion of the lock tooth 110 adjacent to the shaft portion 111 rides on the shaft portion 111, and a large bending force is applied to the lock tooth 110. On the other hand, the lock tooth 110 tends to rotate anticlockwise about the contact point to a cam 109 as a fulcrum, due to the load applied to an external gear 110d. Therefore, the portion of the external gear 110d adjacent to the shaft portion 111 displaces from an internal gear 107a to the released direction, and the engagement between the external gear 10d and the internal gear 107a is weaken. Further, when the bearing portion of the lock tooth 110 is broken at an about center position, the lock tooth 110 tends to rotate about the contact with the cam 110 as a fulcrum. Therefore, the attitude of the lock tooth 110 is not stabilized, and the engagement between the external gear 10d and the internal gear 107a is degraded. This increases the difficulty of improving the strength.

Second Embodiment

Figure 4:
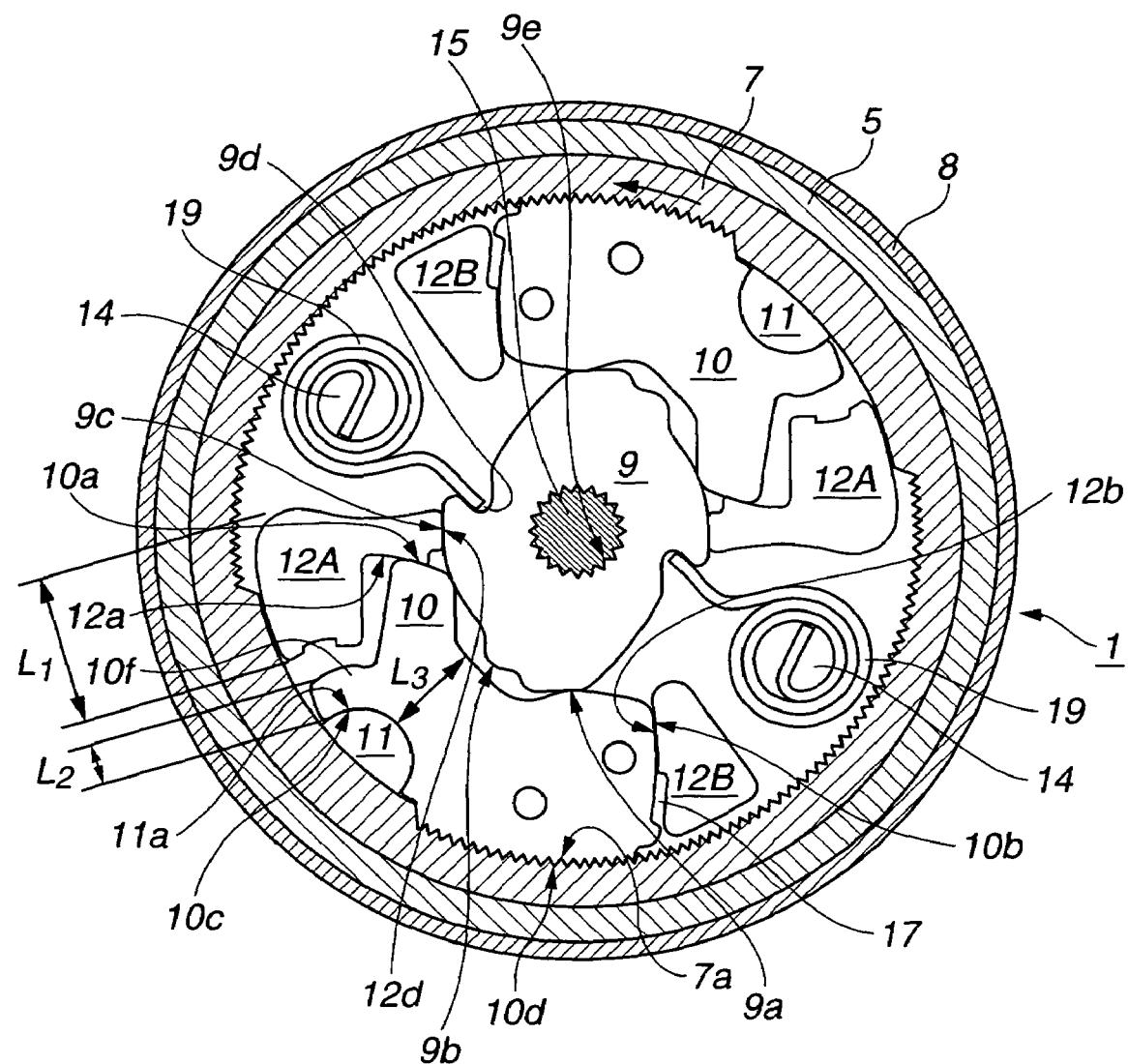
FIG. 4 is a view, partially in section, showing a constitution of a vehicle seat reclining device according to a second embodiment of the present invention.

Subsequently, there is discussed the vehicle seat reclining device 1 according to a second embodiment of the present invention. In the explanation of the second embodiment, the explanation of the parts similar to those of the first embodiment is omitted. In the first embodiment according to the present invention, the weak portion 10f is formed by partially narrowing the width in the diametrical direction about the rotational center of the lock tooth 10 through the provision of the cutout portion 10e between the end portion of the bearing portion of the lock tooth 10 and the part of the first slide outer-peripheral surface 10a. In contrast, according to the second embodiment of the present invention, the weak portion 10f is formed by totally decreasing the width $L_2$ of the end portion of the lock tooth 10 as shown in FIG. 4.

Subsequently, there is discussed the manner of operation of the second embodiment. The operation similar to that of the first embodiment is omitted herein. Since the second embodiment is arranged such that the weak portion 10f is formed by totally decreasing the width $L_2$ of the end portion of the lock tooth 10, it becomes possible to increase a width $L_1$ of the first guide projection 12A. Since the area of the first guide projection 12A for supporting the lock tooth 10 becomes large by this arrangement, the strength thereof is further improved. The width $L_2$ of the weak portion 10f in the diametrical direction about the center of the shaft portion 11 is set at a sufficiently small value relative to a width $L_3$ of a part between the first slide outer-peripheral surface 10a and the external gear 10d so that the weak portion 10f is certainly broken or deformed.

Third Embodiment

Subsequently, there is discussed a third embodiment according to the present invention. Herein, the explanation is made as to the constitution of part different from that of the first embodiment.

Figure 5:
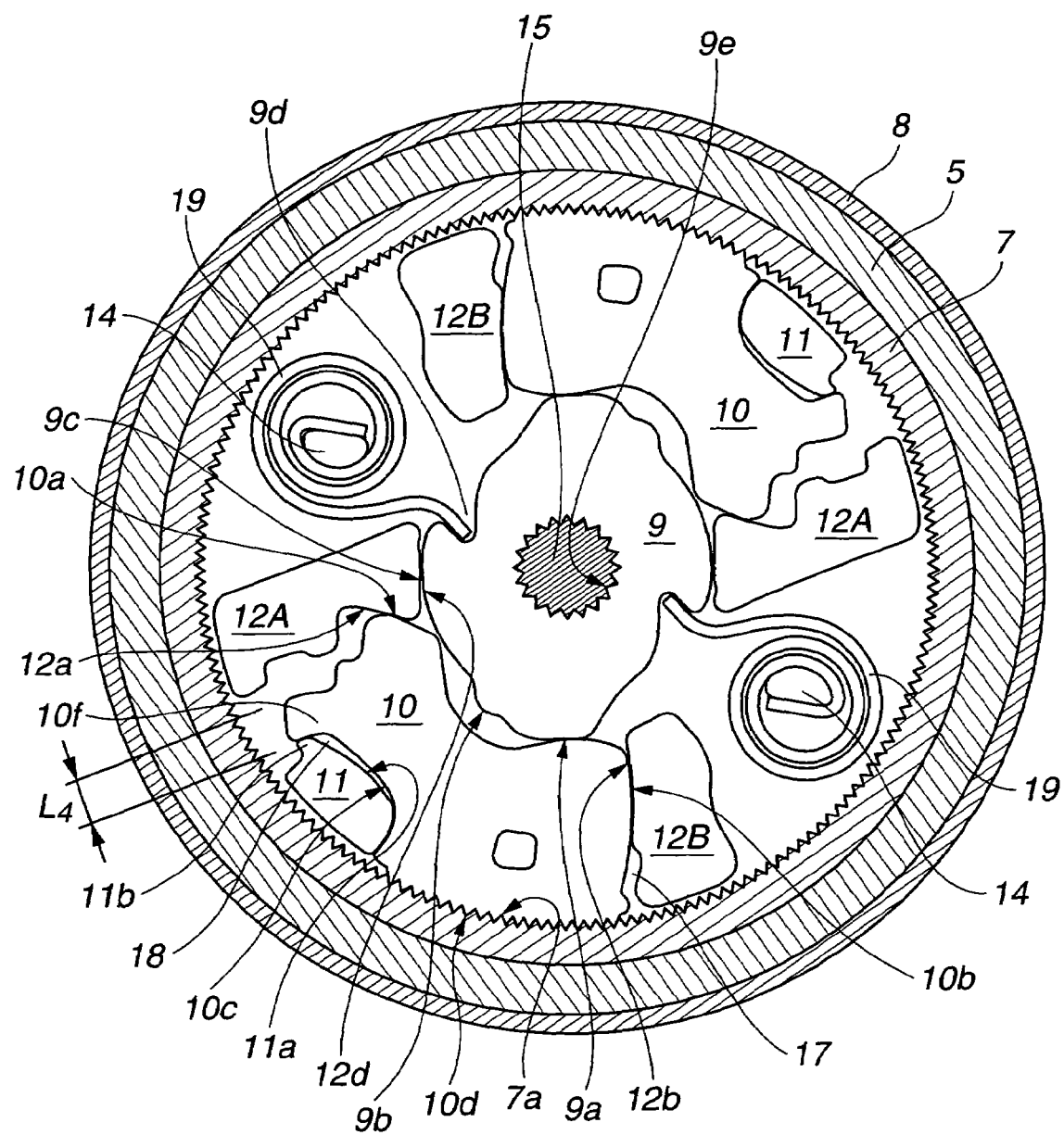
FIG. 5 is a view, partially in section, showing a constitution of a vehicle seat reclining device according to a third embodiment of the present invention.

As shown in FIG. 5, the shaft portion 11 has the inner-periphery guiding surface 11a which swingably supports the lock tooth 10. The inner-periphery guiding surface 11a has a pair of guide contact surfaces in contact with the bearing surface 10a of the lock tooth at both sides in the circumferential direction about the rotation center of the cover member 7. As one guide contact surface, a projection 11b for absorbing stress is formed at an opposite side of the external gear 10d of the inner-periphery guiding surface 11a, and as the other guide contact surface, an inner-periphery guiding contact surface is formed on the inner-periphery guiding surface 11a.

The outer-peripheral surface of the projection 11b is formed into a circular shape which has a radius equal to a distance from the center of the shaft portion 11, and slides in contact with the bearing surface 10c of the lock tooth 10. When the lock tooth 10 is rotated in the anticlockwise direction in FIG. 5 and a large force is applied from the lock tooth 10 to the projection 11b, the projection 11b is crushed by the lock tooth 10, and therefore a reaction force $R_3$ applied from the shaft portion 11 to the lock tooth 10 decreases. Further, a force for displacing the portion of the external gear 10d adjacent to the shaft portion 11 into the direction of weakening the engagement between the external gear 10d and the internal gear 7a also decreases.

An inner-peripheral clearance 18 is formed between the inner-periphery guiding surface 11a of the shaft portion 11 and the bearing portion 10c of the lock tooth 10, which is opposite to the inner-periphery guiding surface 11a, (between a pair of guide contact surfaces). The inner-peripheral clearance 18 is formed such that a part adjacent to the projection 11b becomes large. For the following two reasons, the inner-peripheral clearance 18 is formed between the inner-periphery guiding surface 11a and the bearing surface 10c. First, if a depressed circular shaped surface for sliding in contact with the inner-periphery guiding surface 11a is continuously formed from an intermediate portion toward the projection 11b as is similar to a conventional semi-circular arc, in case that the lock tooth 10 relatively displaces in the clockwise direction relative to the shaft portion 11, a portion of the lock tooth 10 opposite to the external gear 10d rides on the inner-periphery guiding surface 11a of the shaft portion 11, and the portion of the external gear 10d adjacent to the shaft portion 11 displaces into the direction of separating from the internal gear 7a and of decreasing the engagement between the external gear 10d and the internal gear 7a. In order to prevent this displacement of the lock tooth 10, the inner-peripheral clearance 18 is formed. Second, due to the existence of the outer-peripheral clearance 17, there is generated a bending force directed to the direction that the portion of the external gear 10d adjacent to the shaft portion 11 further strongly engages with the internal gear 7a. Under this situation, due to the existence of the inner-peripheral clearance 18, the portion of the external gear 10 adjacent to the shaft portion 11 is allowed to move toward the internal gear 7a, and therefore, the further strong engagement between the external gear 10d and the internal gear 7a is smoothly achieved.

An inner-peripheral surface portion in contact with the projection 11b in the bearing surface 10c of the lock tooth 10 is formed into a circular arc, which has a radius equal to a distance from the center of the shaft portion 11. By providing the projection 11b and the inner-peripheral clearance 18, the lock tooth 10 slides in contact with the shaft portion 11 at two points of the projection 11b and the inner-periphery guiding contact surface opposite to the projection 11b. This decreases the clearance of the cover member 7 in the circumferential direction so as to suppress the backlash.

In the third embodiment according to the present invention, in addition to the projection 11b, which is formed at the shaft portion 11 to absorb the stress, there is provided the weak portion 10f for inviting breakage or deformation at an end portion of the bearing portion of the lock tooth 10 opposite to the external gear 11d relative to the shaft portion 11. The weak portion 10f is formed such that a width $L_4$ at the end portion of the lock tooth 10 is set to be small as is similar to that of the second embodiment. This arrangement enables the weak portion 10f to be easily broken or deformed in response to a rear side collision of the vehicle.

Since the other constitution of the third embodiment is similar to that of the first embodiment, the explanation thereof is omitted herein.

Subsequently, there is discussed the manner of operation of the vehicle seat reclining device 1 according to the third embodiment of the present invention.

There is explained the manner of operation in the case that a load directed to the forward direction is applied to the seat back 3. In this situation, the cover member 7 tends to relatively rotate in the anticlockwise direction relative to the body frame 5, and therefore the rotational force is transmitted to the lock tooth 10 through the engagement portions of the internal gear 7a and the external gear 10d. The lock tooth 10 tends to rotate in the anticlockwise direction in FIG. 5. At this moment, the lock tooth 10 is supported by the lock cam surface 9a, the projection 11b of the shaft portion 11 and the second outer-periphery guiding surface 12b. Further, two points of the lock tooth 10 are in contact with the shaft portion 11. The two points are the projection 11b and the inner-periphery guiding contact surface opposite to the projection 11b.

Figure 6:
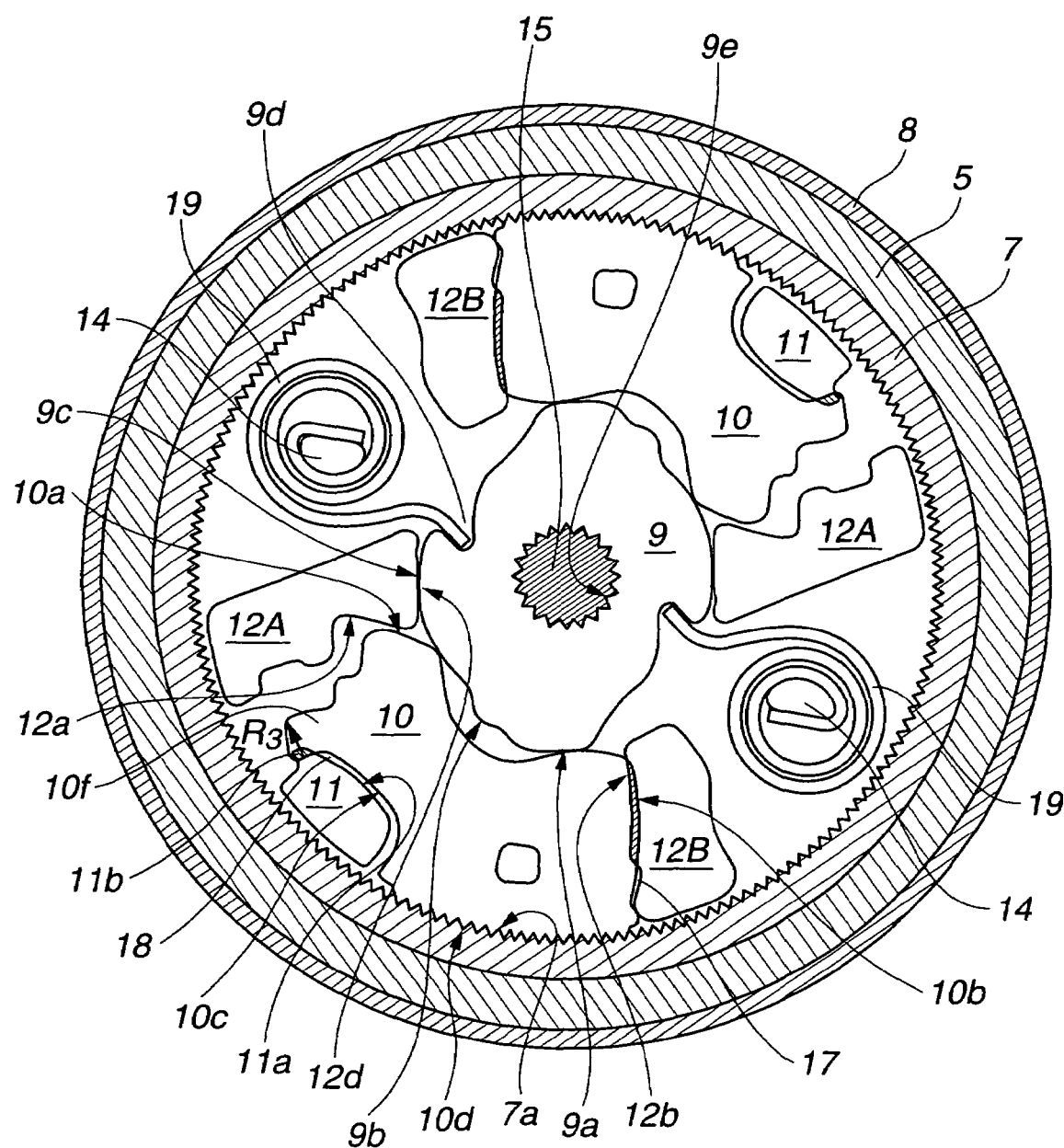
FIG. 6 is an explanatory view of the third embodiment in case that a large load directed to the forward direction is applied to the seat back.

When the forward directional load applied to the seat back 3 becomes large, the projection 11b is crushed as shown in FIG. 6, and contacting portions between the lock tooth 10 and the second outer-periphery guiding surface 12b deform. Since the projection lib crushes in the circumferential direction and absorbs the stress, the reaction force $R_3$ applied from the projection 11b to the lock tooth 10 decreases. Accordingly, the bending stress directed to the direction of bending the lock tooth 10 also decreases, and the breakage of the lock tooth 10 due to the application of the bending force is suppressed.

Since the generated stress has a direction directed to the anticlockwise direction along the circumference, there is prevented a phenomenon that the portion of the external gear 10d adjacent to the shaft portion 11 separates from the internal gear 7a so as to decrease the engagement between the external gear 10d and the internal gear 7a. That is, even if the lock tooth 10 relatively displaces in the anticlockwise direction relative to the shaft portion 11, due to the existence of the inner-peripheral clearance 18 adjacent to the projection 10b of the lock tooth 10 and due to no existence of a circular depressed portion, the lock tooth 10 never rides on the inner-periphery guiding surface 11a of the shaft portion 11. Accordingly, the lock tooth 10 does not receive a large bending force due to the riding on and is not broken thereby. Further, this arrangement certainly prevents the phenomenon that the portion of the external gear 10d adjacent to the shaft portion 11 separates from the internal gear 7a so as to decrease the engagement between the external gear 10d and the internal gear 7a.

Since there is caused the bending moment for displacing the portion of the external gear 10d adjacent to the shaft portion 11 in the direction of further strongly engaging with the internal gear 7a due to the existence of the outer-peripheral clearance 17 and since the inner-peripheral clearance 18 for allowing the movement of the lock tooth 10 is provided, the movement of the lock tooth 10 is not prevented by the shaft portion 11. This promotes the further strong engagement of the external gear 10d to the portion of the internal gear 7a adjacent to the shaft portion 11.

In case that the forward directional load applied to the seat back 3 further increases and that the load cannot be absorbed only by the crush of the projection 11b, the stress concentrates at the weak portion 10f, which is the end portion of the lock tooth 10. Since the weak portion 10f having the width $L_4$ is weak in bending strength, the weak portion 10f is broken or deformed by the excessive load. Therefore, the lock tooth 10 does not receive a large reaction force from the shaft portion 11, and this certainly prevents a phenomenon that the portion of the external gear 10d adjacent to the shaft portion 11 separates from the internal gear 7a so as to decrease the engagement between the external gear 10d and the internal gear 7a.

Although the third embodiment according to the present invention has been shown and described such that the weak portion 10f is formed by decreasing the width of the end portion of the lock tooth 10 totally, the weak portion 10f may be formed by providing a cutout portion at the end portion of the lock tooth 10, or by making the end portion by soft material.

Although the third embodiment according to the present invention has been shown and described such that when the forward directional load is applied to the seat back 3, the cover member 7 relatively rotates in the anticlockwise direction relative to the body frame 5, it may be inversely arranged such that when the backward directional load is applied to the seat back 3, the cover member 7 relatively rotates in the anticlockwise direction relative to the body frame 5.

This application is based on Japanese Patent Applications No. 2006-178888 filed on Jun. 29, 2006 and No. 2006-21889 filed on Jan. 31, 2006 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A seat reclining device for swingably connecting a seat back to a seat cushion, the seat reclining device comprising:
a base member connected to one of the seat back and the seat cushion;
a rotating member connected to the other of the seat back and the seat cushion, the rotating member being rotatable relative to the base member, an internal gear being formed on an inner peripheral surface of the rotating member;
a lock tooth having an external gear, which is engageable with the internal gear of the rotating member, the lock tooth being swingable in directions of engaging and disengaging the external gear with and from the internal gear, the lock tooth having a bearing portion which has an arc shaped bearing surface;
a shaft portion integrally formed with the base member, the shaft portion having an inner-periphery guiding surface, wherein the bearing surface of the lock tooth slides in contact with the inner-periphery guiding surface of the shaft portion, the shaft portion being aligned with the external gear along a circumferential direction about a rotational center of the rotating member;
a pair of guide portions integrally formed with the base member;
a cam pushing the lock tooth to engage the external gear with the internal gear; and
a weak portion which is formed at an end portion of the lock tooth opposite to the external gear across the shaft portion, and induces a breakage or deformation of the end portion.

2. The seat reclining device as claimed in claim 1, wherein the lock tooth has a slide outer-peripheral surface which slides in contact with an outer-periphery guiding surface of one of the guide portions, at a diametrically inner position of the lock tooth about the rotational center of the rotating member, and the weak portion is disposed at a diametrically outer position of the lock tooth about the rotational center of the rotating member.

3. The seat reclining device as claimed in claim 1, wherein the weak portion is formed by decreasing a width of the end portion of the lock tooth as compared with other portions of the lock tooth.

4. The seat reclining device as claimed in claim 1, wherein the weak portion is made soft in strength as compared with other portions of the lock tooth.

5. The seat reclining device as claimed in claim 1, wherein the lock tooth is supported by the shaft portion and one of the guide portions when a load of that relatively rotates the rotating member with respect to the base member occurs.

6. The seat reclining device as claimed in claim 5, wherein both end portions of the inner-periphery guiding surface of the shaft portion act as a pair of guide contact surfaces in contact with the lock tooth.

7. The seat reclining device as claimed in claim 6, wherein a projection for absorbing stress is integrally formed with the shaft portion at one of the guide contact surfaces opposite to the external gear.

8. The seat reclining device as claimed in claim 7, wherein an inner-periphery side clearance is formed between the inner-periphery guiding surface and the bearing surface of the lock tooth opposite to the inner-periphery guiding surface, and between the pair of the guide contact surfaces.

9. The seat reclining device as claimed in claim 8, wherein an outer-periphery guiding surface for sliding in contact with the lock tooth is formed on a surface of one of the guide portions facing with the lock tooth, and an outer-periphery side clearance is formed at an inner gear side of the outer-periphery side guide surface and between the one of the guide portions and the lock tooth.

10. A vehicle seat reclining device comprising:
a seat cushion;
a seat back swingably connected to the seat cushion;
a base member connected to one of the seat back and the seat cushion;
a rotating member connected to the other of the seat back and the seat cushion, the rotating member being rotatable relative to the base member, an internal gear being formed on an inner peripheral surface of the rotating member;
a lock tooth having an external gear, which is engageable with the internal gear of the rotating member, the lock tooth being swingable in directions of engaging and disengaging the external gear with and from the internal gear, the lock tooth having a bearing portion which has an arc shaped bearing surface;
a shaft portion integrally formed with the base member, the shaft portion having an inner-periphery guiding surface, wherein the bearing surface of the lock tooth slides in contact with the inner-periphery guiding surface of the shaft portion; and
a cam pushing the lock tooth to engage the external gear with the internal gear;
wherein the lock tooth has a weak portion which is formed at an end portion of the lock tooth opposite to the external gear across the shaft portion, and which induces a breakage of deformation of the end portion.

* * * * *